(12) United States Patent
Dinges et al.

(10) Patent No.: US 11,567,862 B2
(45) Date of Patent: Jan. 31, 2023

(54) CONFIGURABLE NVM SET TO TRADEOFF BETWEEN PERFORMANCE AND USER SPACE

(71) Applicant: Intel Corporation, Santa Clara, CA (US)

(72) Inventors: Cody Dinges, Longmont, CO (US); Joseph Tarango, Longmont, CO (US); Jim Baca, Longmont, CO (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 16/821,842

(22) Filed: Mar. 17, 2020

(65) Prior Publication Data

US 2020/0218649 A1 Jul. 9, 2020

(51) Int. Cl.
*G06F 12/00* (2006.01)
*G06F 12/02* (2006.01)
*G06F 12/0893* (2016.01)
*G06F 11/30* (2006.01)
*G06K 9/62* (2022.01)

(52) U.S. Cl.
CPC ...... *G06F 12/0246* (2013.01); *G06F 11/3006* (2013.01); *G06F 11/3034* (2013.01); *G06F 12/0893* (2013.01); *G06K 9/6218* (2013.01); *G06F 2212/7202* (2013.01)

(58) Field of Classification Search
CPC ............. G06F 12/0246; G06F 11/3006; G06F 11/3034; G06F 12/0893; G06F 2212/7202; G06F 2209/5011; G06F 9/5016; G06F 2212/1024; G06F 12/0868; G06F 12/0871; G06F 2212/214; G06F 2212/222; G06F 12/0897; G06F 2212/7208; G06K 9/6218
USPC ........................................................ 365/185
See application file for complete search history.

(56) References Cited

U.S. PATENT DOCUMENTS

| | | | |
|---|---|---|---|
| 10,210,167 B1 * | 2/2019 | Sorenson, III | H04L 67/1097 |
| 2019/0042128 A1 | 2/2019 | Tarango | |
| 2019/0042129 A1 | 2/2019 | Tarango et al. | |
| 2019/0042413 A1 | 2/2019 | Wysocki et al. | |
| 2019/0043604 A1 * | 2/2019 | Baca | G11C 29/883 |
| 2020/0225857 A1 | 7/2020 | Tarango et al. | |
| 2020/0379897 A1 * | 12/2020 | Vogan | G06F 3/0679 |

OTHER PUBLICATIONS

Petersen, Chris et al., "Enabling NVMe I/O Determinism @ Scale", Presented at Flash Memory Summit, Santa Clara, CA, US, 2017, 32 pgs.

(Continued)

*Primary Examiner* — Mardochee Chery
(74) *Attorney, Agent, or Firm* — Essential Patents Group, LLP.

(57) ABSTRACT

An embodiment of an electronic apparatus may include one or more substrates, and logic coupled to the one or more substrates, the logic to determine a set of requirements for a persistent storage media based on input from an agent, dedicate one or more banks of the persistent storage media to the agent based on the set of requirements, and configure at least one of the dedicated one or more banks of the persistent storage media at a program mode width which is narrower than a native maximum program mode width for the persistent storage media. Other embodiments are disclosed and claimed.

20 Claims, 10 Drawing Sheets

(56) References Cited

OTHER PUBLICATIONS

Petersen, Chris et al., "NVM Sets and Read Recovery Level", U.S.A. NVM Express Technical Proposal 4018a, Jul. 23, 2018, 17 pgs.

Petersen, Chris et al., "Solving Latency Challenges with NVM Express SSDs at Scale", Presented at Flash Memory Summit, Santa Clara, CA, US, 2017, 27 pgs.

\* cited by examiner

CONFIGURABLE NVM SET TO TRADEOFF BETWEEN PERFORMANCE AND USER SPACE

BACKGROUND

NVM EXPRESS (NVMe) is a specification defining how host software communicates with non-volatile memory (NVM) across a PCI EXPRESS (PCIe) bus. It is the industry standard for PCIe solid state drives (SSDs) in a variety of form factors (e.g., U.2, M.2, AIC, EDSFF). The NVMe specification defines a more efficient interface for SSD devices, providing lower latency, and is more scalable for SSDs than some legacy interfaces. The NVMe specification contains host-to-device protocol for SSD commands used by an operating system for: read, write, flush, TRIM, firmware management, temperature, errors and others. The NVMe specification version 1.4 (dated June 2019, nvmexpress.org) defines an optional "NVM Set" as a collection of NVM that is separate (e.g., logically and potentially physically) from NVM in other NVM Sets.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
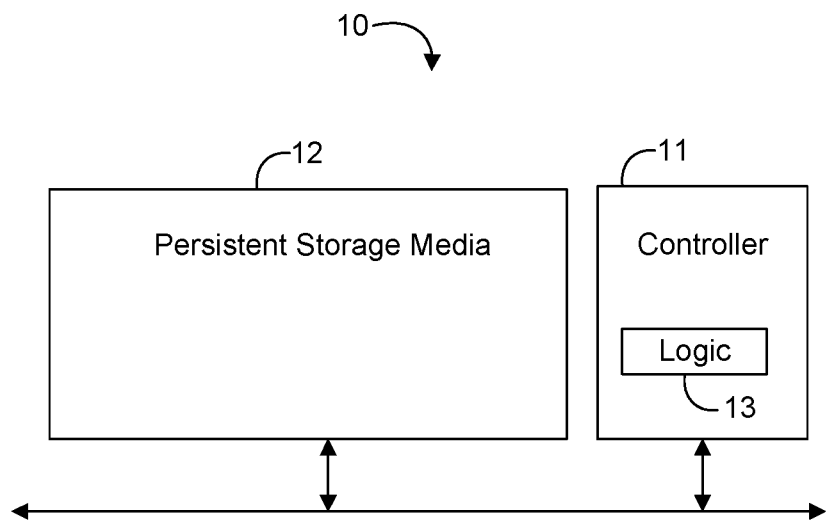
FIG. 1 is a block diagram of an example of an electronic storage system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic storage system 10 may include persistent storage media 12, and a controller 11 communicatively coupled to the persistent storage media 12. The controller 11 may include logic 13 to determine a set of requirements for the persistent storage media 12 based on input from an agent, dedicate one or more banks of the persistent storage media 12 to the agent based on the set of requirements, and configure at least one of the dedicated one or more banks of the persistent storage media 12 at a program mode width which is narrower than a native maximum program mode width for the persistent storage media 12. For example, the input from the agent may include a performance configurable NVM Set (PCNS), as described in further detail herein. In some embodiments, the logic 13 may be further configured to configure a cache hierarchy within the dedicated one or more banks of the persistent storage media 12. Additionally, or alternatively, the logic 13 may be configured to relocate blocks of the persistent storage media 12, and re-target predicted faulted blocks to an offline pool as the blocks are relocated (e.g., for a garbage collection pooling module as described in further detail herein).

In some embodiments, the logic 13 may be further configured to mark blocks for offline status, exercise the blocks marked for offline status, determine an integrity of the exercised blocks, and indicate an amount of free space for the persistent storage media 12 based on the determined integrity of the exercised block (e.g., for a self-test mode generator module as described in further detail herein). In some embodiments, the logic 13 may be further configured to cluster a candidate tier of constructed blocks (e.g., for an online data cluster module as described in further detail herein), and calculate concurrent limitations for the cluster based on one or more regression sets (e.g., for an online re-vectoring concurrency set module as described in further detail herein). Additionally, or alternatively, the logic 13 may be configured to construct a namespace of blocks suitable for a use mode (e.g., for a virtual namespace set construction module as described in further detail herein), and provide a notification of an availability of the namespace for the use mode if the constructed namespace is determined to be large enough based on the set of requirements (e.g., for an administration async notification module as described in further detail herein). In any of the embodiments herein, the persistent storage media 12 may comprise a SSD.

Embodiments of each of the above controller 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the persistent storage media 12, the logic 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, other persistent storage media, or other system memory may store a set of instructions which when executed by the controller 11 cause the system 10 to implement one or more components, features, or aspects of the system 10 (e.g., the logic 13, determining the set of requirements for the persistent storage media 12 based on input from the agent, dedicating one or more banks of the persistent storage media 12 to the agent based on the set of requirements, configuring at least one of the dedicated one or more banks of the persistent storage media 12 at the program mode width, etc.).

Figure 2:
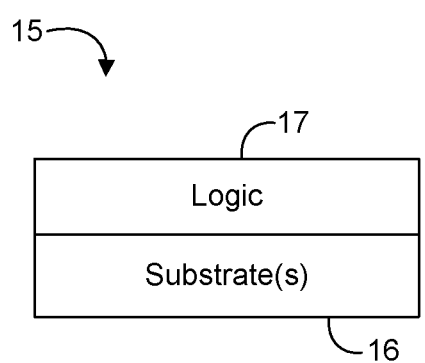
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to determine a set of requirements for a persistent storage media based on input from an agent, dedicate one or more banks of the persistent storage media to the agent based on the set of requirements, and configure at least one of the dedicated one or more banks of the persistent storage media at a program mode width which is narrower than a native maximum program mode width for the persistent storage media. For example, the input from the agent may include a PCNS. In some embodiments, the logic 17 may be further configured to configure a cache hierarchy within the dedicated one or more banks of the persistent storage media. Additionally, or alternatively, the logic 17 may be configured to relocate blocks of the persistent storage media, and re-target predicted faulted blocks to an offline pool as the blocks are relocated (e.g., for a garbage collection pooling module).

In some embodiments, the logic 17 may be further configured to mark blocks for offline status, exercise the blocks marked for offline status, determine an integrity of the exercised blocks, and indicate an amount of free space for the persistent storage media based on the determined integrity of the exercised block (e.g., for a self-test mode generator module). In some embodiments, the logic 17 may be further configured to cluster a candidate tier of constructed blocks (e.g., for an online data cluster module), and calculate concurrent limitations for the cluster based on one or more regression sets (e.g., for an online re-vectoring concurrency set module). Additionally, or alternatively, the logic 17 may be configured to construct a namespace of blocks suitable for a use mode (e.g., for a virtual namespace set construction module), and provide a notification of an availability of the namespace for the use mode if the constructed namespace is determined to be large enough based on the set of requirements (e.g., for an administration async notification module). In any of the embodiments herein, the persistent storage media may comprise a SSD.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
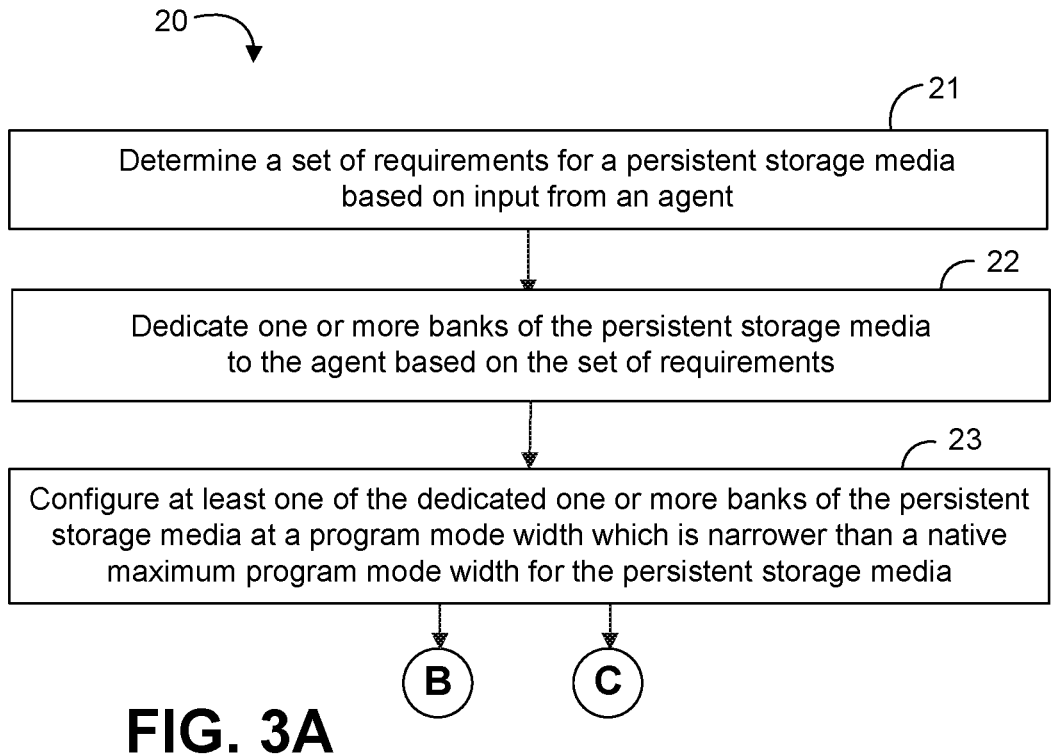
FIGS. 3A to 3C are flowcharts of an example of a method of managing storage according to an embodiment.
Figure 3B:
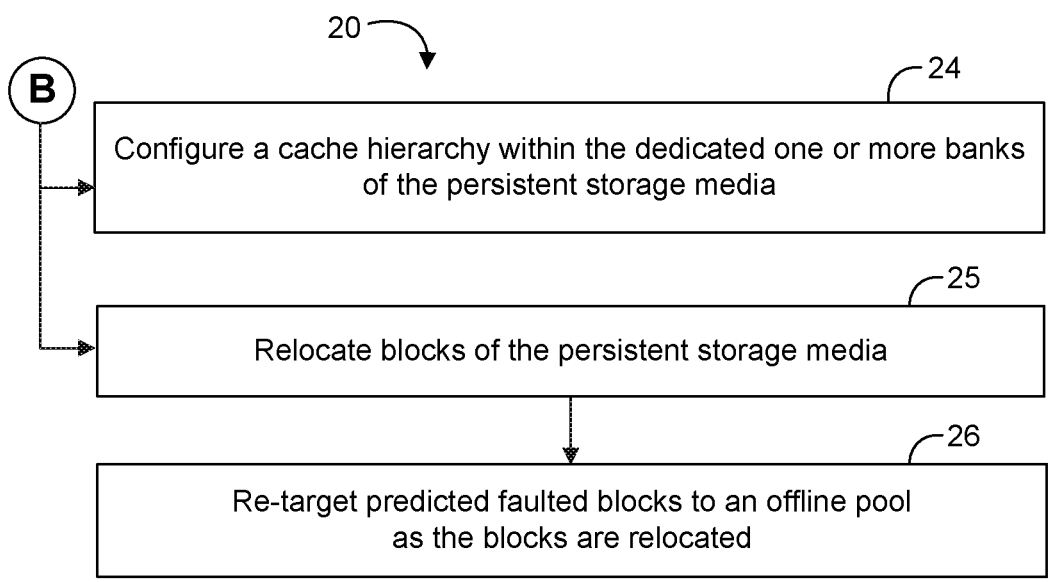
Figure 3C:
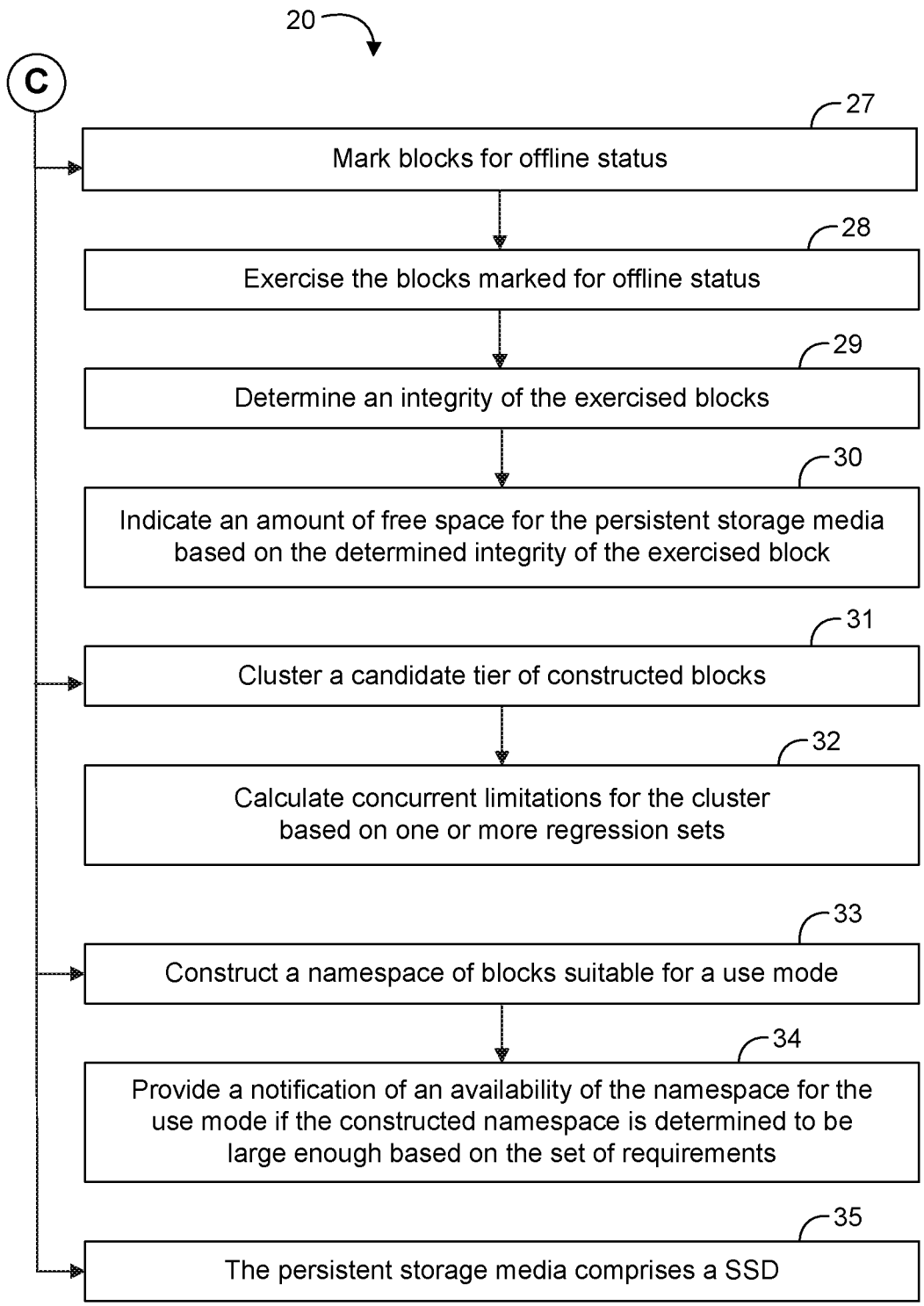

Turning now to FIGS. 3A to 3C, an embodiment of a method 20 of managing storage may include determining a set of requirements for a persistent storage media based on input from an agent at block 21, dedicating one or more banks of the persistent storage media to the agent based on the set of requirements at block 22, and configuring at least one of the dedicated one or more banks of the persistent storage media at a program mode width which is narrower than a native maximum program mode width for the persistent storage media at block 23. For example, the input from the agent may include a PCNS. Some embodiments of the method 20 may further include configuring a cache hierarchy within the dedicated one or more banks of the persistent storage media at block 24. Additionally, or alternatively, the method 20 may also include relocating blocks of the persistent storage media at block 25, and re-targeting predicted faulted blocks to an offline pool as the blocks are relocated at block 26.

In some embodiments, the method 20 may further include marking blocks for offline status at block 27, exercising the blocks marked for offline status at block 28, determining an integrity of the exercised blocks at block 29, and indicating an amount of free space for the persistent storage media based on the determined integrity of the exercised block at block 30. Embodiments of the method 20 may also include clustering a candidate tier of constructed blocks at block 31, and calculating concurrent limitations for the cluster based on one or more regression sets at block 32. Additionally, or alternatively, the method 20 may also include constructing a namespace of blocks suitable for a use mode at block 33, and providing a notification of an availability of the namespace for the use mode if the constructed namespace is determined to be large enough based on the set of requirements at block 34. In any of the embodiments herein, the persistent storage media may comprise a SSD at block 35.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for a performance configurable NVM set (PCNS) in NVM DIMMs (NVDIMMS), SSDs, etc. For example, a PCNS may establish dedicated NVM Sets of incrementally improved performance (e.g., with a tradeoff of less user space). A conventional NVM Set provides technology to isolate banks (e.g., channels and dies) of a NAND memory array within a SSD to dedicated host applications or processes through effective physical partitions in the interest in reducing serial NAND channel contention (and therein read latency) between IOs across multiple applications or processes utilizing the same SSD storage device (e.g., sometimes referred to as "noisy neighbors") therein improving the reliability and predictability of read quality of service (QoS).

Multi-level memory repurposing, sometimes also referred to as just-in-time block repurposing (JiTBR), provides technology to reprogram a memory block from a first number of bits to a second number of bits, typically to reduce loss of defective NAND erase blocks. Overprovisioning may improve drive bandwidth and QoS by reducing overall accessible user space on the drive and increasing the effective spare of the drive. Conventional NVM Sets and overprovisioning technology bind the application/process to native media access modes/widths. Some implementations of JiTBR rely on media defect discovery outside of the applications control. In addition to isolation needs, various host applications or processes may have different performance needs in terms of tradeoffs between capacity and latency/throughput which are not addressed by conventional NVM Sets. Advantageously, some embodiments may provide overcome one or more the foregoing problems with embodiments of performance configurable NVM Set technology as described herein.

As the density of NAND technology increases, longer latency may be encountered at the cost of high throughput. For example, a single level cell (SLC) may provide less capacity but faster throughput as compared to a multi-level cell (MLC), which may provide less capacity but faster throughput as compared to a tri-level cell (TLC), and so on. The choice of throughput or latency optimized operations, however, may be somewhat arbitrary because some NAND technology (e.g., INTEL OPTANE memory technology) can natively support more than one programming mode (e.g., SLC, MLC, TLC, quad-level cell (QLC), and so on). For example, a particular namespace may benefit from some middle ground latency to throughput (e.g., latency in between the lowest possible latency and highest possible latency with a tradeoff of less capacity). Some embodiments may advantageously provide technology for a customer to customize namespaces with individual application level QoS/throughput needs on a mutable device.

Some embodiments may provide technology for adaptable regions of a virtual indirection to allow for a customized experience. For example, the virtual regions may allow for the NAND technology programming modes to be configured based on the needs of the application stream and/or virtual space. In some embodiments, the configurations can be accessible through a get log page for the current state of the drive. Some embodiments may read the needed modes or throughput/latency requirements from the log page and issue an administration command to change the programming/read modes of the NAND device(s) to support the requested modes or indicated throughput/latency requirements for a given application.

In some embodiments, PCNS technology may provide a means for end-users or manufacturers of NAND-Based SSDs to configure dedicated banks of NAND media (e.g., NVM Sets) at specific bit-per-cell program mode (PM) widths. The specified PM width may be narrower than the native maximum PM width supported by the NAND media to improve the throughput performance and/or endurance of those NVM Sets (e.g., relative to the native maximum PM width of the NAND media) at the cost of user space. Embodiments of PCNS technology may also be applied to NVDIMMs, flash drives, etc. that utilize multi-level NAND media. Embodiments of technology to customize/configure dedicated banks of NAND flash media advantageously provides an agent/end-user/host/administrator/application/process/etc. the ability to tune the performance and endurance of the storage device specifically for their needs. Embodiments of PCNS technology allow the end-user to leverage each "Set" in a unique fashion based on their applications' goals and latency sensitivities. For example, high intensity data mining applications could leverage a SLC configured PCNS, while cold storage applications could utilize a QLC configured PCNS on the same device. PCNS technology may also enable a cache hierarchy within a NAND-based SSD. Using a cache hierarchy, for example, end-users could relocate data to various PCNS(s) based on anticipated application fetches to boost performance for specific processes. Advantageously, embodiments provide flexibility to enable a mutable single SSD device to be configured by an application to meet an agent's/end user's/customer's needs for the latency and throughput potentials of the native media (e.g., multi-level NAND-based media, INTEL OPTANE, etc.).

As a media module ages, the performance decreases. In conventional technologies, blocks with unsatisfactory performance may be disables to maintain a desired storage performance requirement. With block repurposing, however, as a block ages the sensing of the module may be re-defined to interpret the energy signatures in lower modes of operation. The decreased level of sensing and charging of the module means that the performance of the block changes in respect to reads and programs. Identification of these modules for re-use allows for a minimization of spare loss for critical media events. The higher potential of these blocks means may support construction of faster data streams which utilize the repurposed blocks. In order to facilitate the additional functionality, embodiments of PCNS may target the before degraded blocks by reconstructing a virtualized allocation either according to the original performance metrics or to advertise a new potential with the corresponding namespace size.

Embodiments of PCNS may be implemented as a modular design with a variety of architecture layers within the ecosystem, including one or more of the following modules: 1) Garbage Collection Pooling Module: As blocks are relocated, the predicted faulted blocks are to be re-targeted to an offline pool to evaluate the status. The initial estimate of the block in the previous mode determines the next mode free space until self-test is complete; 2) Self-test Mode Generator Module: The blocks marked for offline status will be exercised in order to determine an integrity of the media such that the passing mode will be the final free space indicator; 3) Online Data Cluster Module (based on desired features): As these blocks are constructed, the performance of each module may have variation not acceptable for a virtual set. Thus, all of the resulting data will be used to K-Means cluster for the candidate tier; 4) Online Re-vectoring Module (concurrency sets): With the blocks clustered, the concurrent limitations may be calculated from ODLs regression sets. The allocation of the set determines the target window of operation for the next allocation set; 5) Virtual Namespace Set Construction Module: After the blocks are determined to be of similar features and are listed in a potential concurrency mode, the use mode operation state is ready to be advertised; and/or 6) Administration Async Notification Module: After a large enough namespace is allocated, the controller will notify the host of the new potential (e.g., if the feature is enabled).

Figure 4:
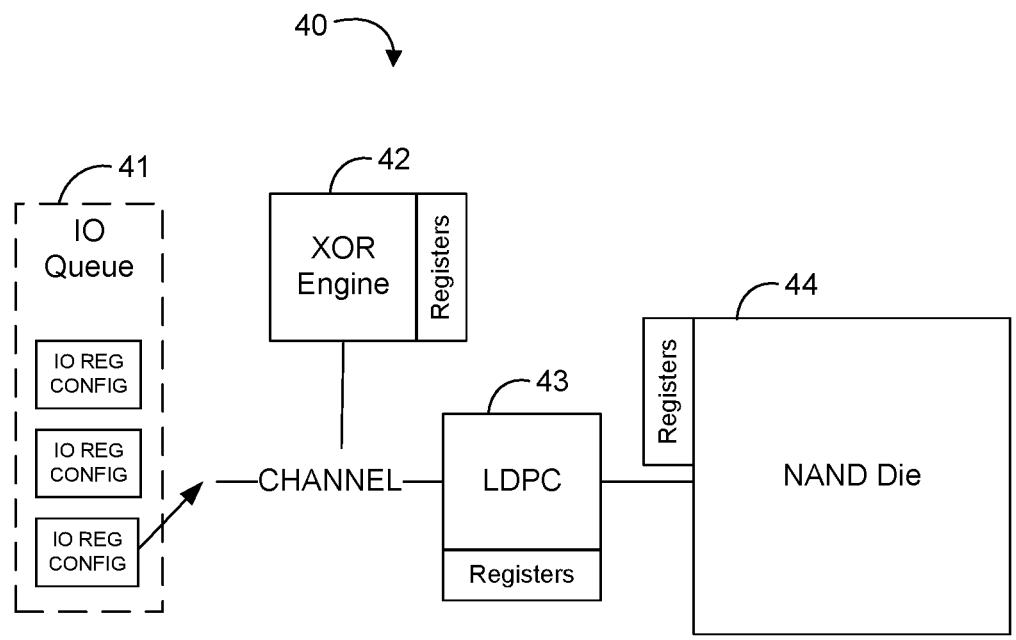
FIG. 4 is a block diagram of an example of a computing system according to an embodiment.

With reference to FIG. 4, an embodiment of a computing system 40 may include an IO queue 41 coupled through an IO channel to an exclusive-or (XOR) engine 42 and a low-density parity check (LDPC) accumulator 43. The LDPC accumulator 43 may also be coupled to NAND die 44. The IO queue 41 may include a plurality of IO register configurations, and each of the XOR engine 42, LDPC accumulator 43, and NAND die 44 may include associated registers. The components of the computing system 40 may cooperate (e.g., through suitable firmware (FW)) to manage media at different width PMs. For example, FW code may treat subsets of the NAND array (e.g., "bands") in narrower PM widths. For example, a "write pen" may be configured to treat fundamental indirection coherency writes to media in SLC-configured bands for writing indirection metadata (e.g., context, context journal, etc.). FW code may also be configured to capture runtime data structures to SLC-configured bands to support power-loss-imminent (PLI) dumps needed for power loss recovery. To accomplish narrower PMs, NAND channel registers may be configured to adjust reference and program voltage levels (e.g., NAND trims) on the media to treat access to specific physical addresses at the appropriate PM (e.g., SLC, MLC, etc.). Band management FW may be configured to track how each band is used and to insert appropriate soft structures based on the desired configurations into associated NAND channel queues. Channel FW may be configured to consume the soft structures from their channel's associated IO queue for programming registers on the NAND die 44, the XOR engine 42, and the LDPC accumulator 43 to establish the NAND's PM for particular IO operations.

Figure 5:
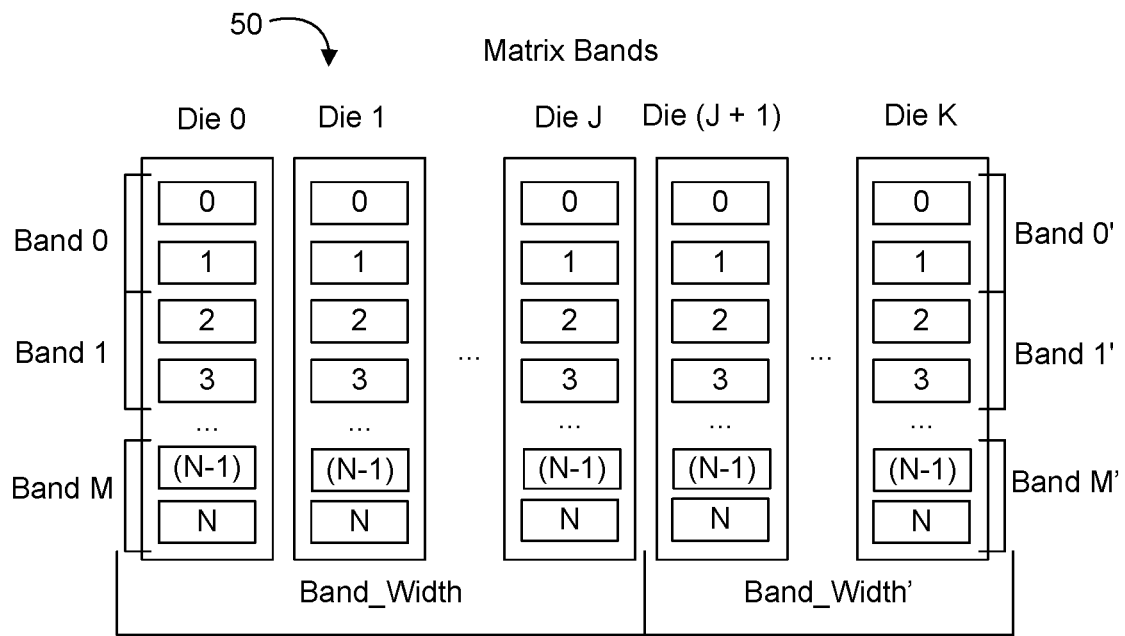
FIG. 5 is a block diagram of an example of a storage device according to an embodiment.

With reference to FIG. 5, an embodiment of a storage device 50 may, in addition to or as an alternative to conventional band arrangements, support matrix bands. The device 50 may include Die 0 through K (K>J; J>2). Each Die may include erase blocks (EBs) 0 through N (N>1). The EBs may be organized in bands 0 through M (M>1) for a first band width (Band_Width), and bands 0' through M' for a second band width (Band_Width'). Embodiments of PCNS may extend conventional NVM Set technology. In some embodiments, a band may refer to a set of equal logically numbered NAND erase blocks (EBs) which span across all NAND die in a given NAND array. For example, all the page blocks (PBs) may be written in a logically numbered order until all EBs are programmed before selecting a new band for initialization and use for a special purpose (e.g., host data, drive metadata, etc.). To establish a physically isolated NVM Set, a matrix band may further divide bands according to a desired die (partition) count, an example of which is shown in FIG. 5. Matrix bands of equal die counts may utilize independent spares, as well as FW for independent garbage collection and wear leveling. For example, FW may be aware of the die count associated with specific sizes of matrix bands, and associated band management FW may account for differences in the sizes of bands.

In accordance with some embodiments, the matrix band FW is configured to be PCNS aware in addition to die size aware. Instead of assuming natively supported PMs for calculation of available space on bands, for example, embodiments of band management FW may take into account that different bands may have different PM widths. For example, generation of soft structures needed for configuring channel registers and application of NAND trim voltage references may be made in accordance with the appropriate PM data density for each band. By tracking desired or configured access PMs for each set of matrix bands (e.g., or respective PCNSs) in a soft FW data structure, for example, band management FW and write pen FW can correctly traverse the available physical addresses and configure the NAND channel registers correctly for IO operations.

Figure 6:
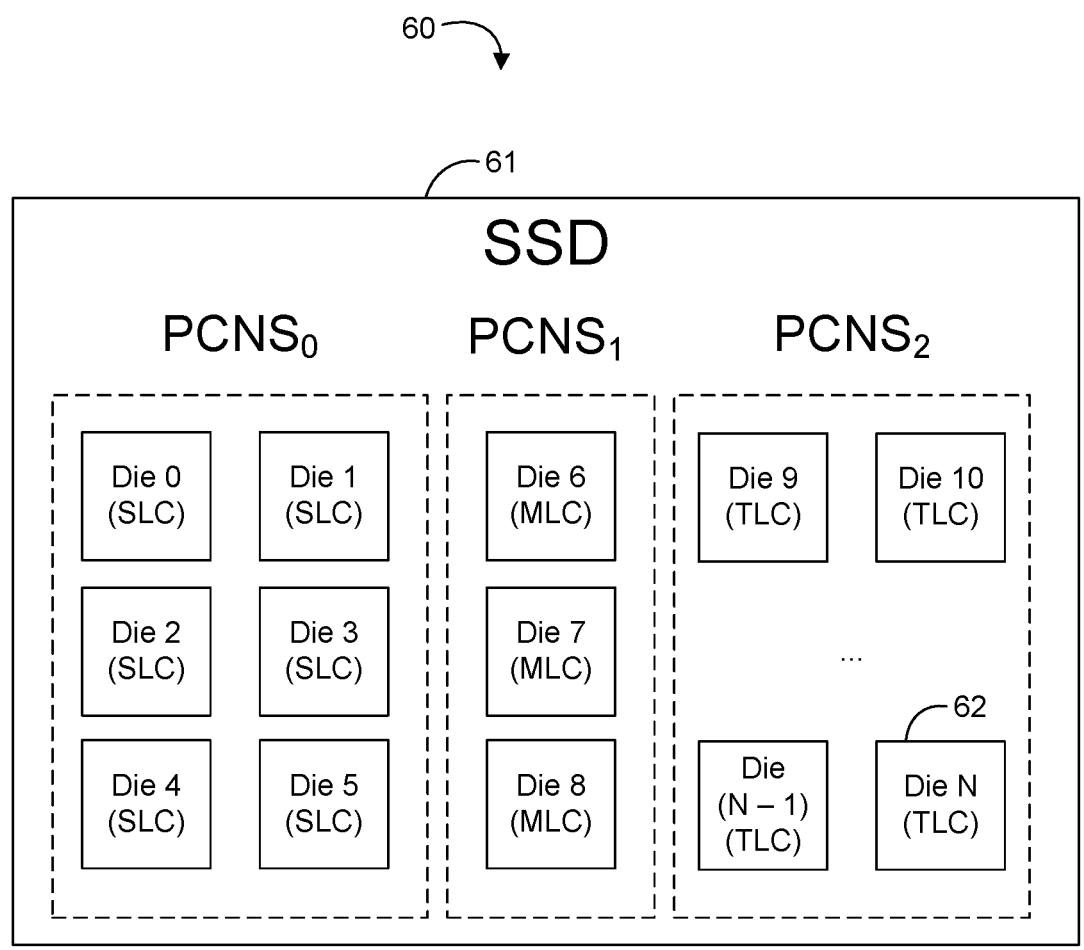
FIG. 6 is a block diagram of an example of a storage system according to an embodiment.

With reference to FIG. 6, an embodiment of a storage system 60 may include a SSD 61 with N NAND die 62 configured in three PCNS arrangements ($PCNS_0$, $PCNS_1$, and $PCNS_2$). $PCNS_0$ may include six (6) NAND die programmed as SLC memory. $PCNS_1$ may include three (3) NAND die programmed as MLC memory. $PCNS_2$ may include the remainder of the N NAND die programmed as TLC memory. The SSD 61 may include additional NAND die outside of these three PCNS.

PCNS may be implemented at the SSD interface in several forms because the functionality may be made available to SSD manufacturers and/or end-users in a variety of configuration which may depend on definitions and/or usage. In some embodiments, interfacing to PCNS occurs in two stages: (1) establishment of a "Set" of NAND in a given PM; and (2) dispatching IO to distinctive PCNS based on desired performance.

A non-limiting example of technology to establish a "Set" of NAND at specified PMs includes having a SSD manufacturer pre-define the size of "Sets" (e.g., the die count for a given "Set" of "Matrix Bands"), as well as the PM for those associated "Sets." In this way, the SSD manufacturer may control the size and number of unique "Sets" within a given device. In some embodiments, the PM associated for a given "Set" of "Matrix Bands" may be embedded into persistent memory (e.g., ROM) on the device (e.g., as a factory configuration) such that runtime FW may read those configurations to make the device PCNS aware and enabling suitable band management FW and write pen FW to correctly configure channel registers. For example, a SSD manufacturer may collect information about typical customer use cases, access frequency over LBA ranges, common workloads, etc., to offer a variety of PCNS abilities to customers (e.g., customer data may be utilized to determine the size of the various "Matrix Bands" and associated PMs at the manufacturing level). In some embodiments, availability of a PCNS or NVM Set's PM may be reported via a log page or part of an NVM Set's Attribute Entry. In some embodiments, the "Set" may be established via a Namespace association. FIG. 6 shows an example of a nominally vertical PCNS. Other non-limiting arrangements may include horizontal, scatter-gather, etc.

Another non-limiting example of technology to establish a "Set" of NAND at specified PMs includes providing the functionality to the end-user as a supplement to a NVM Sets aware administration command (e.g., "NVM Sets Aware Set Features" as proposed for NVM Sets "Read Recovery Level"). For example, the end-user may specify the desired PM in accordance with various performance levels (e.g., see Table 1 for example performance levels). The desired PM configuration for each "Set" or NVM Set may be stored as non-volatile data structure (e.g., as drive parameters, a factory configuration, etc.).

TABLE 1

| PCNS Perf Level | NAND PM | Read Latency (Rt) | Program Latency (Pt) |
|---|---|---|---|
| $K_0$ | SLC | $Rt_0$ ($Rt_0 < Rt_1$) | $Pt_0$ ($Pt_0 < Pt_1$) |
| $K_1$ | MLC | $Rt_1$ ($Rt_0 < Rt_1 < Rt_2$) | $Pt_1$ ($Pt_0 < Pt_1 < Pt_2$) |
| $K_2$ | TLC | $Rt_2$ ($Rt_1 < Rt_2 < Rt_3$) | $Pt_2$ ($Pt_1 < Pt_2 < Pt_3$) |
| $K_3$ | QLC | $Rt_3$ ($Rt_2 < Rt_3 < Rt_4$) | $Pt_2$ ($Pt_2 < Pt_3 < Pt_4$) |
| ... | ... | ... | ... |
| $K_N$ | "N"LC | $Rt_N$ ($Rt_{N-1} < Rt_N$) | $Pt_N$ ($Pt_{N-1} < Pt_N$) |

A non-limiting example of technology to dispatch IO to a specific "Set" of the available PCNSs or a specific NVM Set includes interfacing by way of a Namespace (NS) association.

For example, a specified range of LBAs may be established within a specified NS, and that NS may only be associated with a specific "Set" or NVM Set. By dispatching IO to the specified NS, the PM performance behavior corresponding to the associated PCNS may be guaranteed by the storage device.

Figure 7A:
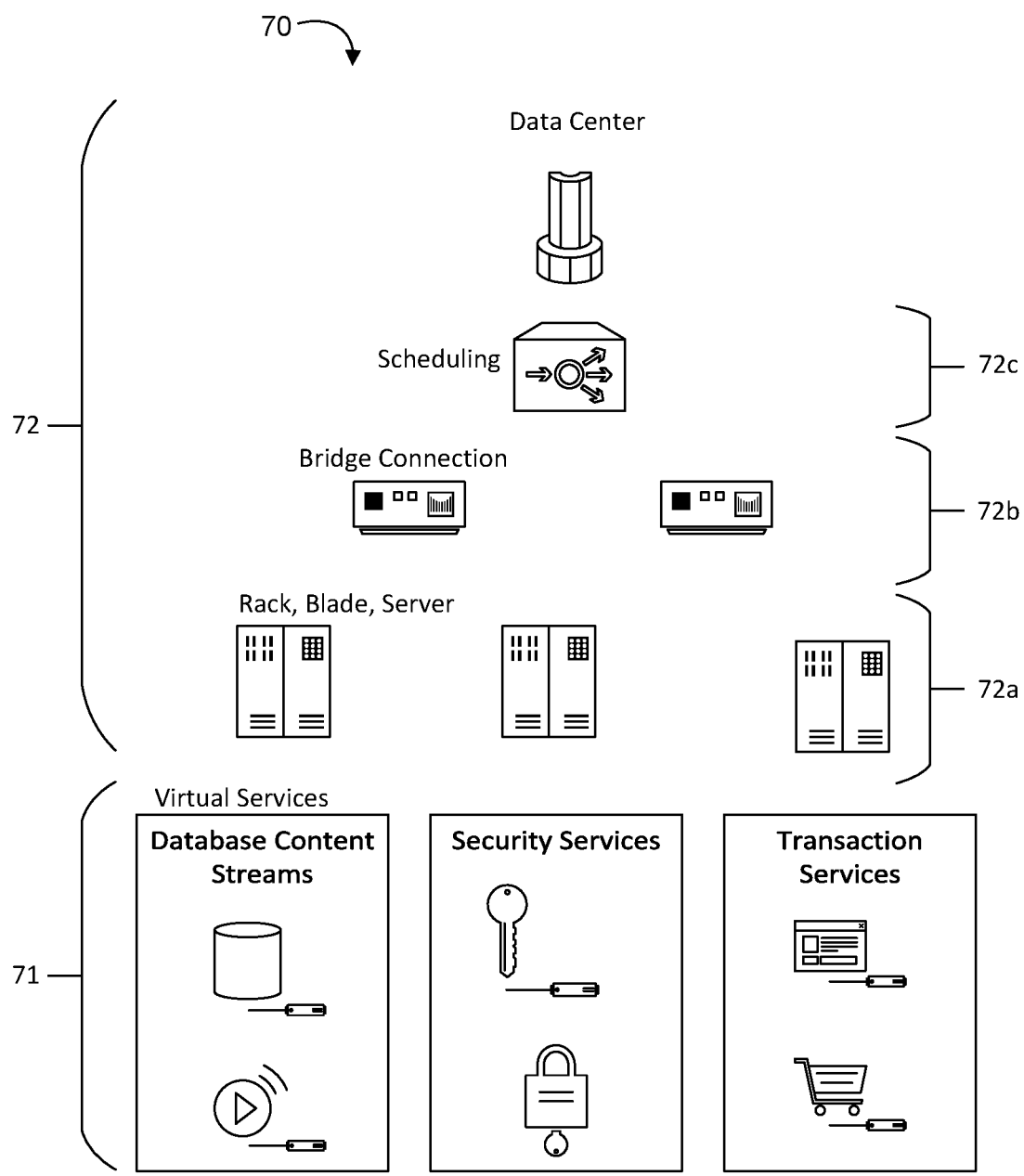
FIG. 7A is a block diagram of an example of a computing environment according to an embodiment.
Figure 7B:
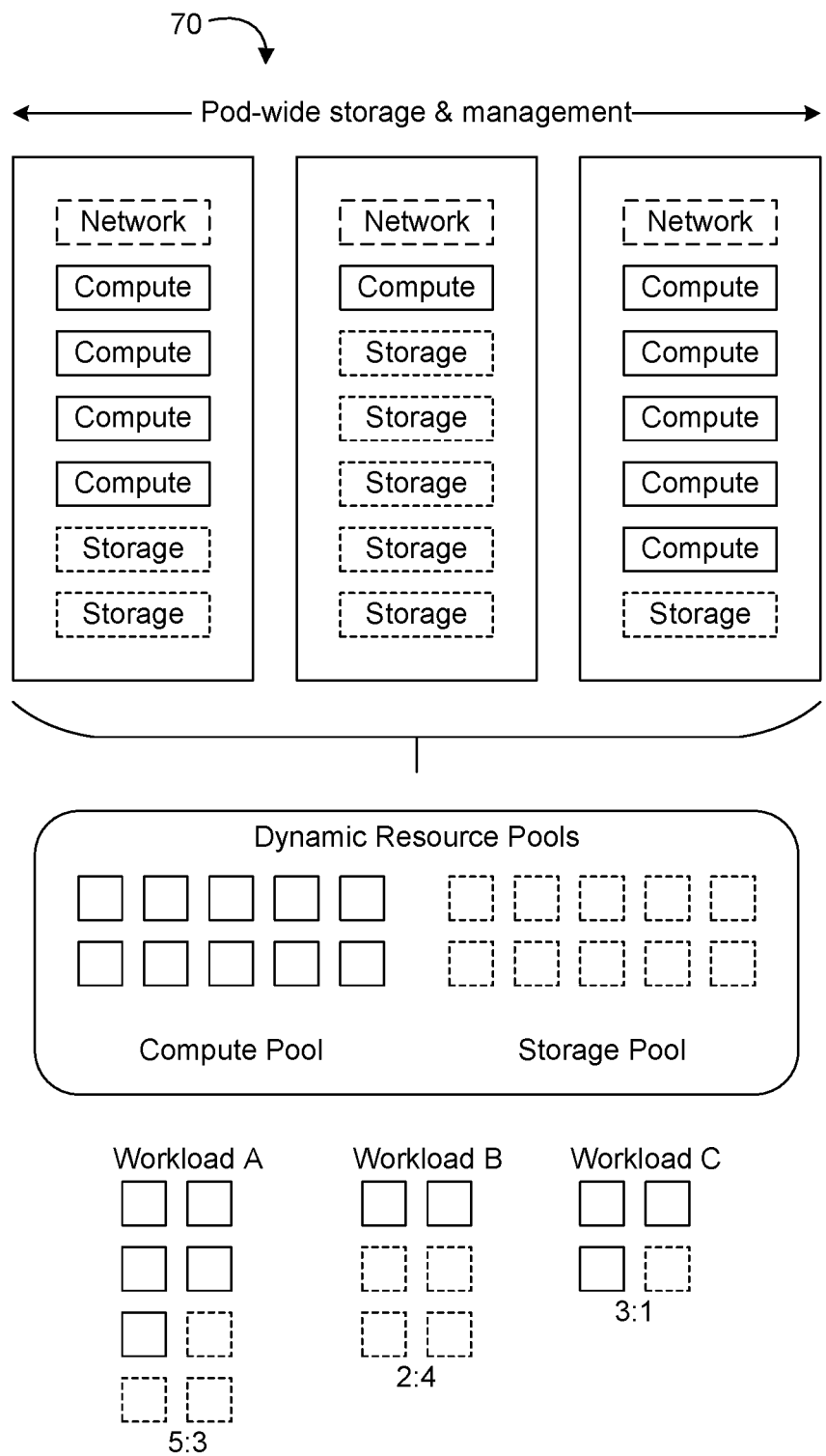
FIG. 7B is a block diagram of an example of a resource allocation system according to an embodiment for the computing environment from FIG. 7A.
Figure 7C:
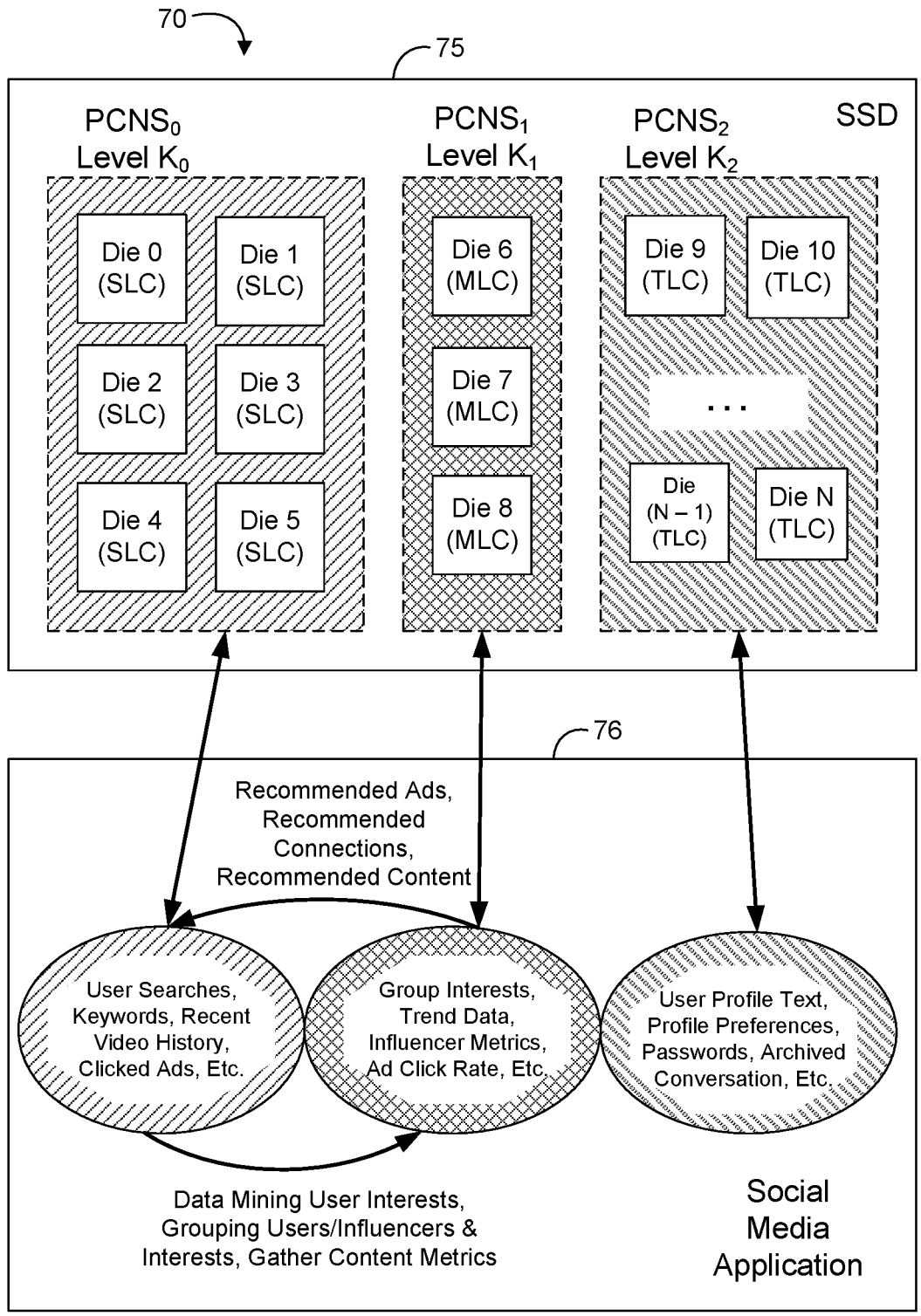
FIG. 7C is a block diagram of an example of a storage device and application according to an embodiment for the computing environment from FIG. 7A.

With reference to FIGS. 7A to 7C, an embodiment of a computing environment 70 may support of variety of virtual services 71 (e.g., database content streams, security services, transaction services, etc.) at a data center 72 which may include a plurality of computing devices 72a (racks, blades, servers, etc.) coupled via bridge connections 72b and scheduling hardware/software 72c. FIG. 7B shows an example of an allocation and partitioning of a storage resource based on an application. FIG. 7C shows an example of a PCNS-enabled SSD 75 configured to support a social media application 76.

Embodiments of PCNS may be beneficial for a broad variety of use cases. Social media applications, for example, may have particular sensitivities to read latency and may benefit from NVM Sets and PCNS. For example, PCNS may provide a platform for various dataset velocities. Referencing Table 1, the social media application 76 may configure the SSD 75 with several PCNSs ranging from $K_0$ to $K_2$, for example. $K_2$ may be used for infrequently accessed database files such as user profiles, passwords, and preferences. On the other end of the spectrum, $K_0$ may be used for user search keywords and objects. $K_0$ content may be rapidly read and analyzed to data mine for individual interests. Those interests may be cross referenced and grouped with other users and stored in $K_1$ for tracking trends of interests across groups. Combined, these tiers provide an opportunity for foundational social media infrastructure (e.g., stored in $PCNS_2$ at level $K_2$), as well as a cache hierarchy for rapidly generating trend advertising content across individuals and groups ($K_0$ and $K_1$). This PCNS configuration may also be effectively utilized to steer user connections with advertising influencers with common interests.

Another example use case for a data center includes a PCNS configuration to leverage high bandwidth portions of a SSD as a power loss solution for their infrastructures. For example, a first PCNS may support a partition that is left unwritten to be utilized as a crash dump partition, while a second PCNS may support a secondary partition for slow collection of infrastructure telemetry. During normal operation the telemetry partition has a very low velocity (e.g., similar to cold storage), while the crash dump partition (e.g., about 500 GB capacity) remains empty. When an imminent power loss is detected in the data center, a high bandwidth write fills the crash dump partition and must complete before running out of generator power. Leaving the crash dump partitions unwritten increases performance on burst writes when needed (e.g., due to a decrease in fragmentation), and configuring the PCNS for the crash dump partition to a lower PM width advantageously guarantees better performance. Establishing two PCNSs in this infrastructure benefits this example use case, creating a high bandwidth $K_0$ PCNS for the crash dump and a native $K_N$ PCNS for the background logging.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
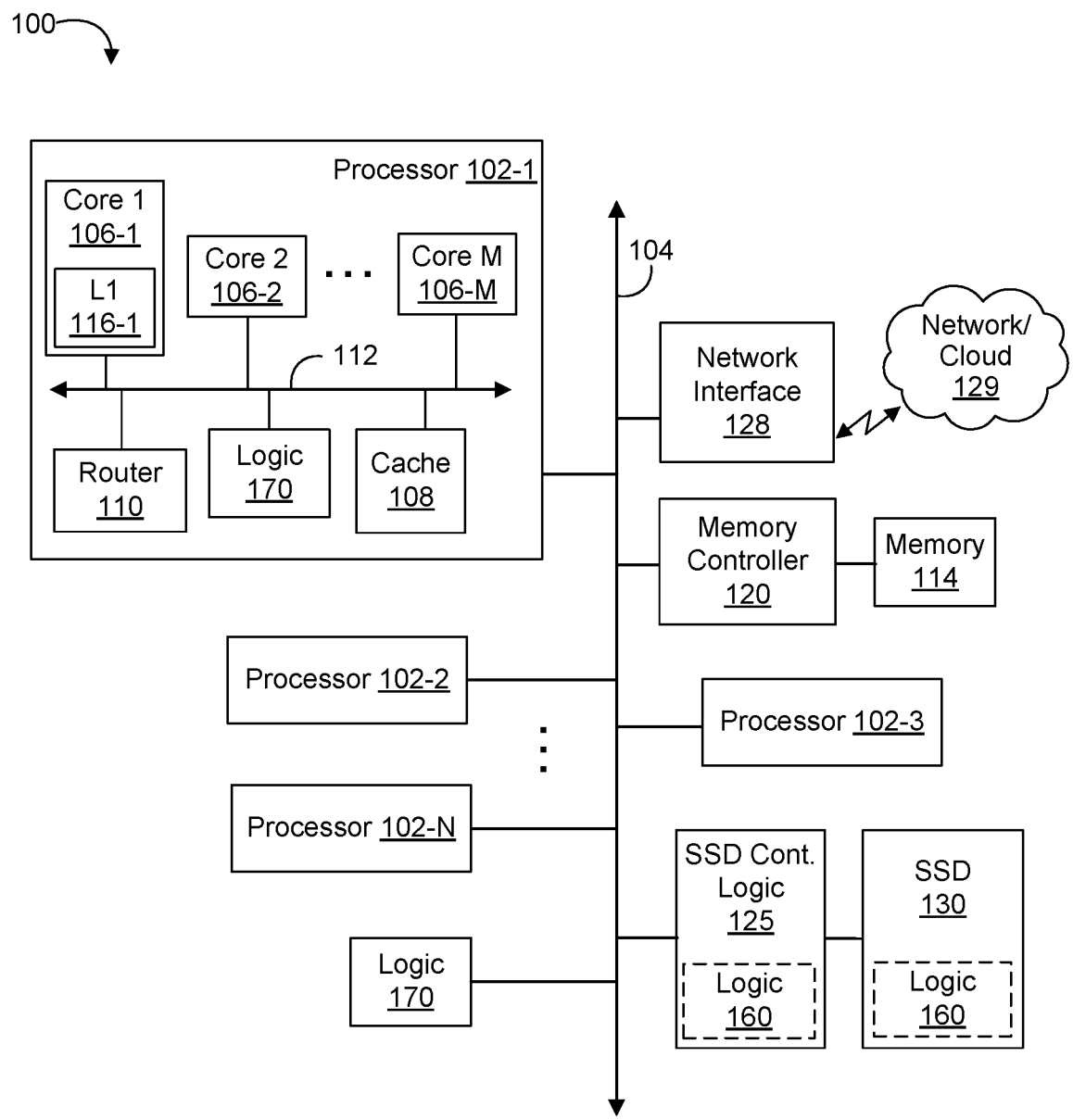
FIG. 8 is a block diagram of another example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 9) or provided on a same integrated circuit (IC) device in various embodiments (e.g., on the same circuit board device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

Figure 9:
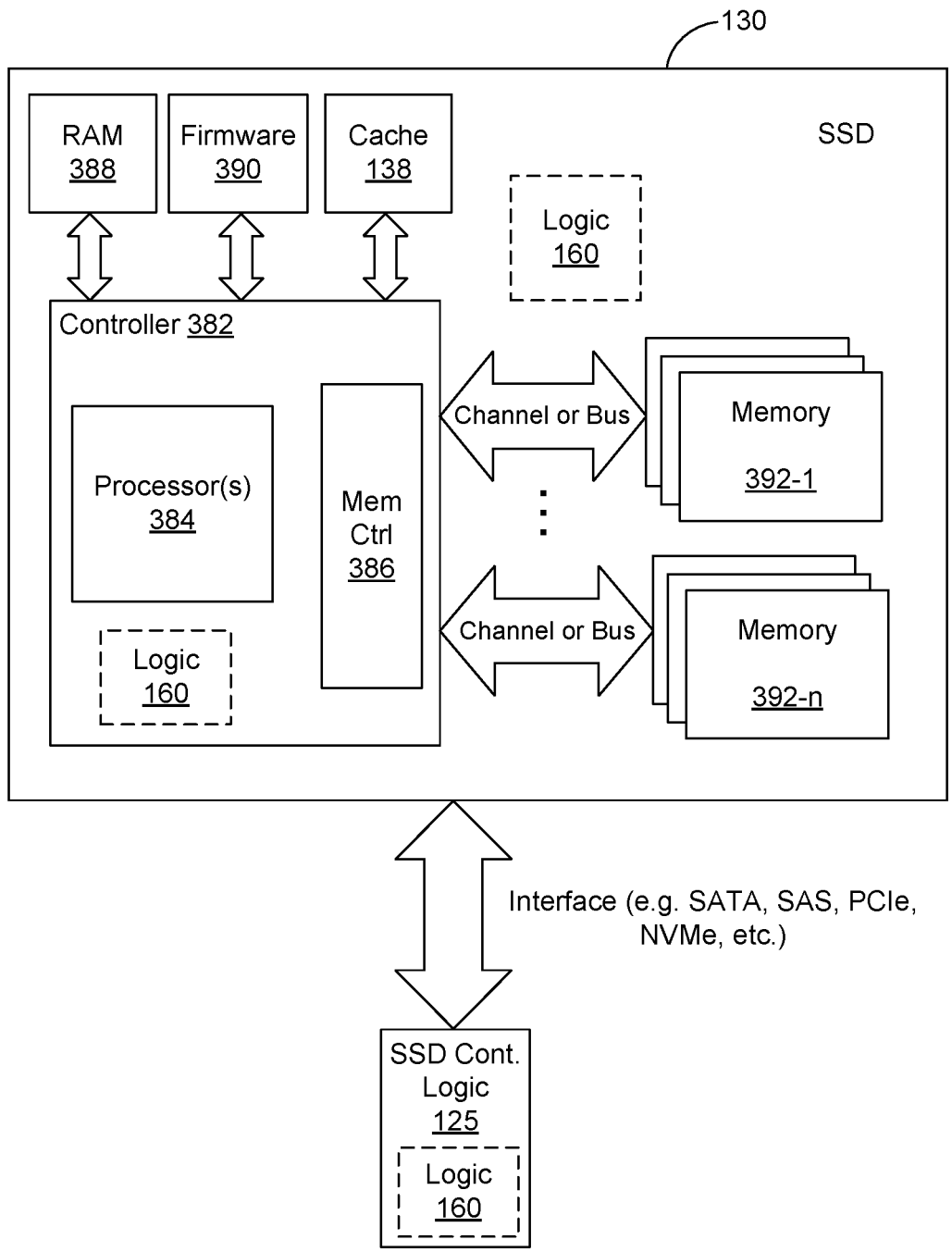
FIG. 9 is a block diagram of an example of a solid state drive (SSD) device according to an embodiment.

FIG. 9 illustrates a block diagram of various components of the SSD 130, according to an embodiment. As illustrated in FIG. 9, logic 160 may be located in various locations such as inside the SSD 130 or controller 382, etc., and may include similar technology as discussed in connection with FIG. 8. The SSD 130 includes a controller 382 (which in turn includes one or more processor cores or processors 384 and memory controller logic 386), cache 138, RAM 388, firmware storage 390, and one or more memory devices 392-1 to 392-N (collectively memory 392, which may include 3D crosspoint, or other types of non-volatile memory). The memory 392 is coupled to the memory controller logic 386 via one or more memory channels or busses. Also, SSD 130 communicates with logic 125 via an interface (such as a SATA, SAS, PCIe, NVMe, etc., interface). Processors 384 and/or controller 382 may compress/decompress data written to or read from memory devices 392-1 to 392-N.

As illustrated in FIGS. 8 and 9, the SSD 130 may include logic 160, which may be in the same enclosure as the SSD 130 and/or fully integrated on a printed circuit board (PCB) of the SSD 130. The system 100 may include further logic 170 outside of the SSD 130. One or more of the features/aspects/operations discussed with reference to FIGS. 1-7C may be performed by one or more of the components of FIGS. 8 and/or 9. Also, one or more of the features/aspects/operations of FIGS. 1-7C may be programmed into the firmware 390. Further, SSD controller logic 125 may also include logic 160. Advantageously, the logic 160 and/or logic 170 may include technology to implement one or more aspects of the system 10 (FIG. 1), the apparatus 15 (FIG. 2), the method 20 (FIGS. 3A to 3C), the system 40 (FIG. 4), the device 50 (FIG. 5), the system 60 (FIG. 6), the computing environment 70, and/or any of the features discussed herein. For example, the logic 170 may include technology to implement the host device/computer system/agent aspects of the various embodiments described herein while the logic 160 may include technology to implement the storage device aspects of the various embodiments described herein.

In particular, the logic 160/170 may be configured to determine a set of requirements for the SSD 130 based on input from an agent, dedicate one or more banks of the SSD 130 to the agent based on the set of requirements, and configure at least one of the dedicated one or more banks of the SSD 130 at a PM width which is narrower than a native maximum PM width for the SSD 130. For example, the input from the agent may include a PCNS. In some embodiments, the logic 160/170 may be further configured to configure a cache hierarchy within the dedicated one or more banks of the SSD 130. Additionally, or alternatively, the logic 160/170 may be configured to relocate blocks of the SSD 130, and re-target predicted faulted blocks to an offline pool as the blocks are relocated (e.g., for a garbage collection pooling module).

In some embodiments, the logic 160/170 may be further configured to mark blocks for offline status, exercise the blocks marked for offline status, determine an integrity of the exercised blocks, and indicate an amount of free space for the SSD 130 based on the determined integrity of the exercised block (e.g., for a self-test mode generator). In some embodiments, the logic 160/170 may be further configured to cluster a candidate tier of constructed blocks (e.g., for an online data cluster module), and calculate concurrent limitations for the cluster based on one or more regression sets (e.g., for an online re-vectoring concurrency set module). Additionally, or alternatively, the logic 160/170 may be configured to construct a NS of blocks suitable for a use mode (e.g., for a virtual namespace set construction module), and provide a notification of an availability of the NS for the use mode if the constructed NS is determined to be large enough based on the set of requirements (e.g., for an administration async notification module).

In other embodiments, the SSD 130 may be replaced with any suitable storage/memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of storage media. For example, the bulk of the storage may be NAND and may further include some faster, smaller granularity accessible (e.g., byte-addressable) NVM such as INTEL 3DXP media. The SSD 130 may alternatively, or additionally, include persistent volatile memory (e.g., battery or capacitor backed-up DRAM or SRAM). For example, the SSD 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIGS. 8 and 9, features or aspects of the logic 160 and/or the logic 170 may be distributed throughout the system 100, and/or co-located/integrated with various components of the system 100.

ADDITIONAL NOTES AND EXAMPLES

Example 1 includes an electronic apparatus, comprising one or more substrates, and logic coupled to the one or more substrates, the logic to determine a set of requirements for a persistent storage media based on input from an agent, dedicate one or more banks of the persistent storage media to the agent based on the set of requirements, and configure at least one of the dedicated one or more banks of the persistent storage media at a program mode width which is narrower than a native maximum program mode width for the persistent storage media.

Example 2 includes the apparatus of Example 1, wherein the logic is further to configure a cache hierarchy within the dedicated one or more banks of the persistent storage media.

Example 3 includes the apparatus of any of Examples 1 to 2, wherein the logic is further to relocate blocks of the persistent storage media, and re-target predicted faulted blocks to an offline pool as the blocks are relocated.

Example 4 includes the apparatus of any of Examples 1 to 3, wherein the logic is further to mark blocks for offline status, exercise the blocks marked for offline status, determine an integrity of the exercised blocks, and indicate an amount of free space for the persistent storage media based on the determined integrity of the exercised block.

Example 5 includes the apparatus of any of Examples 1 to 4, wherein the logic is further to cluster a candidate tier of constructed blocks, and calculate concurrent limitations for the cluster based on one or more regression sets.

Example 6 includes the apparatus of any of Examples 1 to 5, wherein the logic is further to construct a namespace of blocks suitable for a use mode, and provide a notification of an availability of the namespace for the use mode if the constructed namespace is determined to be large enough based on the set of requirements.

Example 7 includes the apparatus of any of Examples 1 to 6, wherein the persistent storage media comprises a solid state drive.

Example 8 includes an electronic storage system, comprising persistent storage media, and a controller communicatively coupled to the persistent storage media, the controller including logic to determine a set of requirements for the persistent storage media based on input from an agent, dedicate one or more banks of the persistent storage media to the agent based on the set of requirements, and configure at least one of the dedicated one or more banks of the persistent storage media at a program mode width which is narrower than a native maximum program mode width for the persistent storage media.

Example 9 includes the system of Example 8, wherein the logic is further to configure a cache hierarchy within the dedicated one or more banks of the persistent storage media.

Example 10 includes the system of any of Examples 8 to 9, wherein the logic is further to relocate blocks of the persistent storage media, and re-target predicted faulted blocks to an offline pool as the blocks are relocated.

Example 11 includes the system of any of Examples 8 to 10, wherein the logic is further to mark blocks for offline status, exercise the blocks marked for offline status, determine an integrity of the exercised blocks, and indicate an amount of free space for the persistent storage media based on the determined integrity of the exercised block.

12 includes the system of any of Examples 8 to 11, wherein the logic is further to cluster a candidate tier of constructed blocks, and calculate concurrent limitations for the cluster based on one or more regression sets.

Example 13 includes the system of any of Examples 8 to 12, wherein the logic is further to construct a namespace of blocks suitable for a use mode, and provide a notification of an availability of the namespace for the use mode if the constructed namespace is determined to be large enough based on the set of requirements.

Example 14 includes the system of any of Examples 8 to 13, wherein the persistent storage media comprises a solid state drive.

Example 15 includes a method of managing storage, comprising determining a set of requirements for a persistent storage media based on input from an agent, dedicating one or more banks of the persistent storage media to the agent based on the set of requirements, and configuring at least one of the dedicated one or more banks of the persistent storage media at a program mode width which is narrower than a native maximum program mode width for the persistent storage media.

Example 16 includes the method of Example 15, further comprising configuring a cache hierarchy within the dedicated one or more banks of the persistent storage media.

Example 17 includes the method of any of Examples 15 to 16, further comprising relocating blocks of the persistent storage media, and re-targeting predicted faulted blocks to an offline pool as the blocks are relocated.

Example 18 includes the method of any of Examples 15 to 17, further comprising marking blocks for offline status, exercising the blocks marked for offline status, determining an integrity of the exercised blocks, and indicating an amount of free space for the persistent storage media based on the determined integrity of the exercised block.

Example 19 includes the method of any of Examples 15 to 18, further comprising clustering a candidate tier of constructed blocks, and calculating concurrent limitations for the cluster based on one or more regression sets.

Example 20 includes the method of any of Examples 15 to 19, further comprising constructing a namespace of blocks suitable for a use mode, and providing a notification of an availability of the namespace for the use mode if the constructed namespace is determined to be large enough based on the set of requirements.

Example 21 includes the method of any of Examples 15 to 20, wherein the persistent storage media comprises a solid state drive.

Example 22 includes at least one non-transitory one machine readable medium comprising a plurality of instructions that, in response to being executed on a computing device, cause the computing device to determine a set of requirements for a persistent storage media based on input from an agent, dedicate one or more banks of the persistent storage media to the agent based on the set of requirements, and configure at least one of the dedicated one or more banks of the persistent storage media at a program mode width which is narrower than a native maximum program mode width for the persistent storage media.

Example 23 includes the at least one non-transitory one machine readable medium of Example 22, comprising a plurality of further instructions that, in response to being executed on the computing device, cause the computing device to configure a cache hierarchy within the dedicated one or more banks of the persistent storage media.

Example 24 includes the at least one non-transitory one machine readable medium of any of Examples 22 to 23, comprising a plurality of further instructions that, in response to being executed on the computing device, cause the computing device to relocate blocks of the persistent storage media, and re-target predicted faulted blocks to an offline pool as the blocks are relocated.

Example 25 includes the at least one non-transitory one machine readable medium of any of Examples 22 to 24, comprising a plurality of further instructions that, in response to being executed on the computing device, cause the computing device to mark blocks for offline status, exercise the blocks marked for offline status, determine an integrity of the exercised blocks, and indicate an amount of free space for the persistent storage media based on the determined integrity of the exercised block.

Example 26 includes the at least one non-transitory one machine readable medium of any of Examples 22 to 25, comprising a plurality of further instructions that, in response to being executed on the computing device, cause the computing device to cluster a candidate tier of constructed blocks, and calculate concurrent limitations for the cluster based on one or more regression sets.

Example 27 includes the at least one non-transitory one machine readable medium of any of Examples 22 to 26, comprising a plurality of further instructions that, in response to being executed on the computing device, cause the computing device to construct a namespace of blocks suitable for a use mode, and provide a notification of an availability of the namespace for the use mode if the constructed namespace is determined to be large enough based on the set of requirements.

Example 28 includes the at least one non-transitory one machine readable medium of any of Examples 22 to 27, wherein the persistent storage media comprises a solid state drive.

Example 29 includes a storage manager apparatus, comprising means for determining a set of requirements for a persistent storage media based on input from an agent, means for dedicating one or more banks of the persistent storage media to the agent based on the set of requirements, and means for configuring at least one of the dedicated one or more banks of the persistent storage media at a program mode width which is narrower than a native maximum program mode width for the persistent storage media.

Example 30 includes the apparatus of Example 29, further comprising means for configuring a cache hierarchy within the dedicated one or more banks of the persistent storage media.

Example 31 includes the apparatus of any of Examples 29 to 30, further comprising means for relocating blocks of the persistent storage media, and means for re-targeting predicted faulted blocks to an offline pool as the blocks are relocated.

Example 32 includes the apparatus of any of Examples 29 to 31, further comprising means for marking blocks for offline status, means for exercising the blocks marked for offline status, means for determining an integrity of the exercised blocks, and means for indicating an amount of free space for the persistent storage media based on the determined integrity of the exercised block.

Example 33 includes the apparatus of any of Examples 29 to 32, further comprising means for clustering a candidate tier of constructed blocks, and means for calculating concurrent limitations for the cluster based on one or more regression sets.

Example 34 includes the apparatus of any of Examples 29 to 33, further comprising means for constructing a namespace of blocks suitable for a use mode, and means for providing a notification of an availability of the namespace for the use mode if the constructed namespace is determined to be large enough based on the set of requirements.

Example 35 includes the apparatus of any of Examples 29 to 34, wherein the persistent storage media comprises a solid state drive.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   logic coupled to the one or more substrates, the logic to:
      determine a set of requirements for a persistent storage media based on input from an agent,
      dedicate one or more banks of the persistent storage media to the agent based on the set of requirements, and
      configure at least one of the dedicated one or more banks of the persistent storage media at a program mode width which is narrower than a native maximum program mode width for the persistent storage media.

2. The apparatus of claim 1, wherein the logic is further to:
   configure a cache hierarchy within the dedicated one or more banks of the persistent storage media.

3. The apparatus of claim 1, wherein the logic is further to:
   relocate blocks of the persistent storage media; and
   re-target predicted faulted blocks to an offline pool as the blocks are relocated.

4. The apparatus of claim 1, wherein the logic is further to:
   mark blocks for offline status;
   exercise the blocks marked for offline status;
   determine an integrity of the exercised blocks; and
   indicate an amount of free space for the persistent storage media based on the determined integrity of the exercised block.

5. The apparatus of claim 1, wherein the logic is further to:
   cluster a candidate tier of constructed blocks; and
   calculate concurrent limitations for the cluster based on one or more regression sets.

6. The apparatus of claim 1, wherein the logic is further to:
   construct a namespace of blocks suitable for a use mode; and
   provide a notification of an availability of the namespace for the use mode if the constructed namespace is determined to be large enough based on the set of requirements.

7. The apparatus of claim 1, wherein the persistent storage media comprises a solid state drive.

8. An electronic storage system, comprising:
   persistent storage media; and
   a controller communicatively coupled to the persistent storage media, the controller including logic to:
      determine a set of requirements for the persistent storage media based on input from an agent,
      dedicate one or more banks of the persistent storage media to the agent based on the set of requirements, and
      configure at least one of the dedicated one or more banks of the persistent storage media at a program mode width which is narrower than a native maximum program mode width for the persistent storage media.

9. The system of claim 8, wherein the logic is further to:
   configure a cache hierarchy within the dedicated one or more banks of the persistent storage media.

10. The system of claim 8, wherein the logic is further to:
relocate blocks of the persistent storage media; and
re-target predicted faulted blocks to an offline pool as the blocks are relocated.

11. The system of claim 8, wherein the logic is further to:
mark blocks for offline status;
exercise the blocks marked for offline status;
determine an integrity of the exercised blocks; and
indicate an amount of free space for the persistent storage media based on the determined integrity of the exercised block.

12. The system of claim 8, wherein the logic is further to:
cluster a candidate tier of constructed blocks; and
calculate concurrent limitations for the cluster based on one or more regression sets.

13. The system of claim 8, wherein the logic is further to:
construct a namespace of blocks suitable for a use mode; and
provide a notification of an availability of the namespace for the use mode if the constructed namespace is determined to be large enough based on the set of requirements.

14. The system of claim 8, wherein the persistent storage media comprises a solid state drive.

15. A method of managing storage, comprising:
determining a set of requirements for a persistent storage media based on input from an agent;
dedicating one or more banks of the persistent storage media to the agent based on the set of requirements; and
configuring at least one of the dedicated one or more banks of the persistent storage media at a program mode width which is narrower than a native maximum program mode width for the persistent storage media.

16. The method of claim 15, further comprising:
configuring a cache hierarchy within the dedicated one or more banks of the persistent storage media.

17. The method of claim 15, further comprising:
relocating blocks of the persistent storage media; and
re-targeting predicted faulted blocks to an offline pool as the blocks are relocated.

18. The method of claim 15, further comprising:
marking blocks for offline status;
exercising the blocks marked for offline status;
determining an integrity of the exercised blocks; and
indicating an amount of free space for the persistent storage media based on the determined integrity of the exercised block.

19. The method of claim 15, further comprising:
clustering a candidate tier of constructed blocks; and
calculating concurrent limitations for the cluster based on one or more regression sets.

20. The method of claim 15, further comprising:
constructing a namespace of blocks suitable for a use mode; and
providing a notification of an availability of the namespace for the use mode if the constructed namespace is determined to be large enough based on the set of requirements.

* * * * *